United States Patent [19]

Haban et al.

[11] Patent Number: 5,408,813
[45] Date of Patent: Apr. 25, 1995

[54] DETHATCHING APPARATUS WITH INDEPENDENTLY ROTATING SETS OF TINES

[75] Inventors: Joseph Haban; Donald R. Wittkowski; Alan Delfs, all of Racine, Wis.

[73] Assignee: Haban Manufacturing Company, Racine, Wis.

[21] Appl. No.: 234,346

[22] Filed: Apr. 28, 1994

[51] Int. Cl.$^6$ .................. A01B 45/00; A01B 34/48; A01B 57/12; A01D 34/48; A01D 57/12
[52] U.S. Cl. ..................... 56/14.8; 56/16.6; 56/249; 172/21
[58] Field of Search .......... 56/14.8, 16.6, 249, 56/294, 400; 172/21, 22

[56] References Cited

U.S. PATENT DOCUMENTS

| 2,476,084 | 7/1949 | Cour | 56/249 |
| 2,924,057 | 2/1960 | Sonmore | 56/249 |
| 3,512,345 | 5/1970 | Smith | 56/400 X |
| 3,678,671 | 7/1972 | Scarnato et al. | 56/294 X |
| 4,776,404 | 10/1988 | Rogers et al. | 175/21 |
| 4,802,536 | 2/1989 | O'Neal | 175/21 X |
| 5,036,651 | 8/1991 | Nelson | 175/21 X |

OTHER PUBLICATIONS

3 Pages of Sears Lawn & Garden Sale Catalog (undated).

Primary Examiner—George A. Suchfield
Attorney, Agent, or Firm—Jansson & Shupe, Ltd.

[57] ABSTRACT

An improved ground-driven dethatching apparatus having at least two sets of independently rotating sets of dethatching tines. Each tine set is positioned along an independently rotating tine shaft which is rotated by a separate drive linkage and ground-engaging wheel. This arrangement ensures adequate torque to rotate the shafts and uniform dethatching when changing directions. The dethatcher automatically adjusts tine height, for example, in response to obstructions or variations in ground conditions.

17 Claims, 4 Drawing Sheets

DETHATCHING APPARATUS WITH INDEPENDENTLY ROTATING SETS OF TINES

FIELD OF THE INVENTION

This invention is related generally to lawn care machinery and, more particularly, to machines used for "dethatching" lawns.

BACKGROUND OF THE INVENTION

Virtually anyone responsible for maintaining a lawn or the like is familiar with thatch, that brown layer of dead grass and vegetation which covers the ground surface. Aside from its unattractive appearance, thatch can cause problems in a lawn. Excess thatch can encourage grass root development above the surface of the soil (within the thatch) promoting "brown-off" and winter injury; and it may increase watering needs to maintain greenness. Thatch can make mowing more difficult when the "spongy" surface allows the mower wheels to sink down into the lawn. Thatch provides a home for insects and lawn disease. Thatch can restrict water and air movement into the soil. In addition, thatch can affect the downward movement of pesticides and fertilizers into the soil.

Many devices have been developed in an effort to remove thatch from a ground surface. One of the most common methods of thatch removal is a hand-held rake. The rake tines are drawn across the ground surface dislodging thatch and plant matter. This method of removing thatch suffers many drawbacks. Raking can be unpleasant, strenuous and time consuming. Raking can cause injuries to the back and hands of the worker. In addition, the thatch must be collected and removed to a compost pile or put in an appropriate waste receptacle.

Several variations on the rake have been developed in an effort to better remove thatch. One such device is a motorized dethatcher designed to be towed behind a tractor. This device has a single rotatable shaft with a plurality tines projecting radially from such shaft. The shaft is rotated by a motor. The rotating tines contact the ground surface and remove thatch. This device is expensive and costs approximately twice the price of the present invention. Another drawback is that the device does not deposit the thatch in a collector bag and simply redeposits the thatch on the ground surface. Thus, additional time and effort must be expended to collect and dispose of the thatch.

Other dethatchers include tines which do not rotate and are mounted in front of or behind a tractor. In each of these devices, a plurality of tines project downward toward the ground from a horizontal surface secured to the tractor. As the tractor moves, the tines are drawn across the ground surface to loosen thatch. All of these designs are less than satisfactory because tine tip speed is limited to the speed of the tractor. This means that dethatching is often incomplete requiring additional work. Another drawback is that the tines are perpendicular to the ground rather than swept back at an angle and, therefore, tend to break and dig into the ground causing damage to the ground surface. These prior art dethatchers do not collect the thatch which they remove. Accordingly an expensive sweeper attachment for the tractor is required or additional time consuming efforts must be taken to collect and remove the lawn debris.

Yet another type of prior art dethatcher is a ground-device and manually pushed by the operator made by Noma Outdoor Products, Inc. This device utilizes a single rotatable tine shaft with a plurality of tines projecting radially therefrom. The ground-driven tine shaft rotates in response to forward motion of the device.

Such ground-driven dethatching devices have a number of disadvantages. The device is heavy and difficult to push. Another disadvantage is that torque provided by a drive wheel is often inadequate to rotate the tine shaft. Due to loading and terrain conditions, torque to rotate the tine shaft is often supplied primarily by one drive wheel. Such torque is frequently insufficient to overcome resistance to tine shaft rotation (for example, when the dethatcher encounters an obstruction) causing the tine shaft and drive wheel to stop rotating and the wheel to skid. Another drawback is that tine tip speed is limited by the rate at which a human can push the device.

All of the prior art dethatchers, with the exception of a hand-held rake, have a further disadvantage in that the tine height is not automatically adjusted in response to loading conditions, irregular terrain or striking an obstruction such as a rock. Without apparatus to automatically raise the tine height, resistance to tine shaft rotation may become excessive causing the tine shaft and drive wheels to stop rotating or cause the tines to break.

Clearly, an inexpensive lawn dethatcher with a tine shaft drive linkage which supplies adequate torque to rotate the tines, automatically adjusts tine height to terrain conditions and collects the thatch which it removes would be a significant improvement.

OBJECTS OF THE INVENTION

It is an object of this invention to provide a dethatching apparatus overcoming some of the problems and shortcomings of devices of the prior art.

Another object is to provide an improved dethatching apparatus with independently rotating sets of tines and a tine shaft drive linkage which supplies adequate torque to rotate the tine sets.

It is a further object to provide an improved dethatching apparatus with independently rotating sets of tines which dethatches in a more uniform manner especially when turning or changing direction.

Another object is to provide an improved dethatching apparatus in which each ground-engaging wheel linked to a tine set rotates independently and at different rates of speed when turning or changing direction.

Another object of the invention is to provide an improved dethatching apparatus in which the tines may be adjusted to a preselected height.

Yet another object is to provide an improved dethatching apparatus in which the tine height is automatically adjusted upon substantial resistance to tine rotation.

A further object is to provide an improved dethatching apparatus in which the maximum tine height is limited during automatic adjustment of the tine height.

Another object is to provide an improved dethatching apparatus in which the resistance required to cause the dethatcher to raise automatically may be adjusted.

An additional object is to provide an improved dethatching apparatus which collects the thatch and plant matter it removes.

These and other important objects will be apparent from the following descriptions and from the drawings.

SUMMARY OF THE INVENTION

Briefly described, the present invention is an improved ground-driven dethatching apparatus for removing thatch and plant matter from a surface such as a lawn or the like. The invention includes a horizontal shaft, a pair of ground-engaging wheels, a plurality of shaft-mounted tines organized into at least two tine sets, a first drive linkage which rotates one set of tines in response to rotation of one wheel and a second drive linkage which rotates the other set of tines independently in response to rotation of the other wheel. The ground-engaging wheels forming part of each linkage are preferably coaxial.

It is most highly preferred that the invention include two independently rotatable tine shafts each having its own set of tines secured thereto. In one preferred embodiment, the tine shafts are coaxial with each other. The tine shafts may also be substantially the same length. In another preferred embodiment the wheels are coaxial with each other along an axis offset from the tine shaft axis.

One highly preferred embodiment includes an apparatus for automatically raising the tine sets upon substantial resistance to tine rotation. This embodiment includes a housing having a pair of sidewalls, each of the tine shafts being journaled in one of the sidewalls and having a distal end outside such sidewall, a pinion gear coupled to each tine shaft distal end, a wheel-mounting member outside each of the sidewalls and supporting one of the wheels along a wheel axis, one of the tine shafts extending rotatably therethrough radially offset from the wheel axis, a ring gear on each wheel positioned to engage one of the pinion gears whereby resistance-slowed rotation of a tine shaft and its respective drive linkage together with forward movement of the dethatcher causes the wheel-mounting members to pivot about the wheel axis to raise the tine shafts.

It is highly preferred that the invention include apparatus for limiting the pivoting movement of the wheel-mounting members, and consequently, the tine height. Such invention has a lift bar having each of its opposite ends secured to one of the wheel-mounting members at a position radially offset from the wheel axis such that the lift bar moves in response to pivoting movement of the wheel mounting members. A stop-member is secured with respect to the housing in position to limit lift bar movement, and thereby, wheel mounting member movement limiting the extent to which the tine sets are raised automatically upon substantial resistance to tine rotation.

Such preferred invention may also include an apparatus for variably resisting the pivoting movement of each wheel-mounting member. This feature comprises a lift bracket secured with respect to the housing, a lift lever pivotably attached to the lift bracket by a variable resistance fastener capable of changing the resistance to pivoting, a lift bar having each of its opposite ends secured to one of the wheel-mounting members at a position radially offset from the wheel axis such that the lift bar moves in response to pivoting movement of the wheel mounting members and means connecting the lift lever and lift bar, whereby resistance to movement of the lift lever is communicated to the lift bar and wheel mounting members to oppose the pivoting motion of the wheel mounting members upon substantial resistance to tine rotation.

Yet another preferred embodiment includes an apparatus for adjusting the tine sets to a predetermined height relative to the ground. This embodiment comprises a housing having a pair of sidewalls, each of the tine shafts being journaled in one of the sidewalls and having a distal end outside such sidewall a wheel-mounting member outside each of the sidewalls and supporting one of the wheels along a wheel axis, one of the tine shafts extending rotatably therethrough radially offset from the wheel axis, a lift bar having each of its opposite ends secured to one of the wheel-mounting members at a position radially offset from the wheel axis such that the lift bar moves in response to pivoting movement of the wheel-mounting members, a lift bracket secured with respect to the housing for receiving a lift lever, a lift lever pivotably attached to the lift bracket, a movable fastener positioned along the lift bracket to prevent rearward movement of the lift lever beyond a preselected position and means connecting the lift lever and lift bar whereby movement of the lift lever pivots the wheel mounting members to change the tine height and the fastener prevents further lowering of the tines.

It is preferred that the tines be swept back at an angle from the tine shaft to provide a raking action to the ground surface.

Highly preferred embodiments of the invention also include a catcher bag positioned behind the tines for receiving thatch and plant matter.

Advantages of the present invention are further discussed in the detailed description of preferred embodiments.

DETAILED DESCRIPTIONS OF THE PREFERRED EMBODIMENTS

Figure 1:
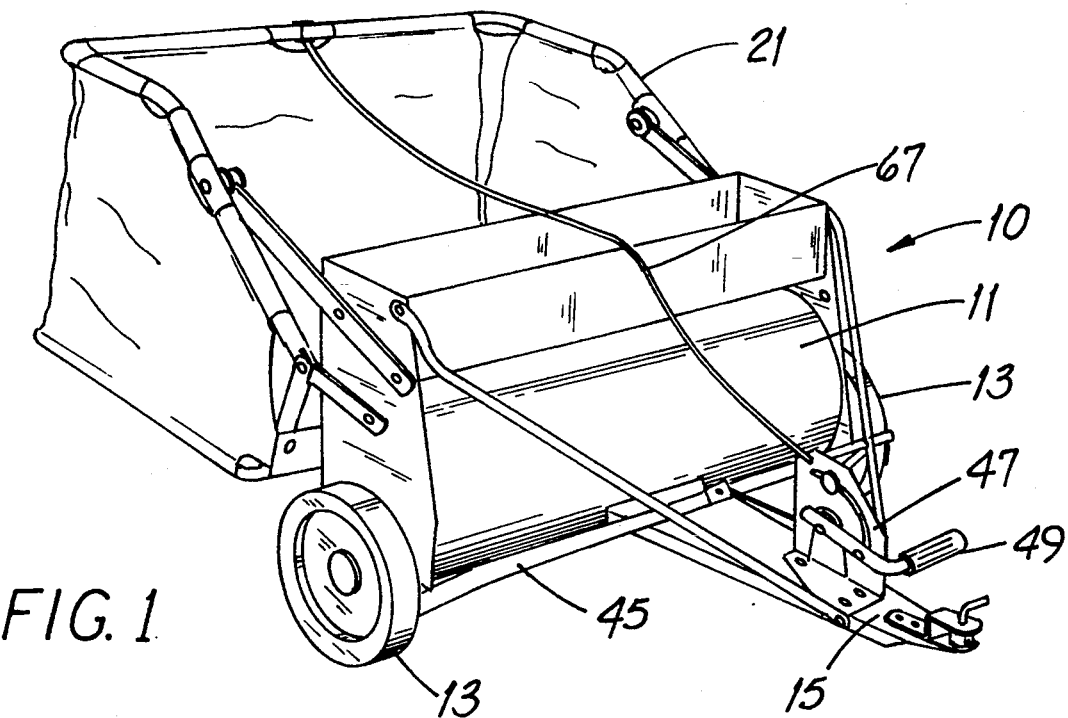
FIG. 1 is a perspective of a dethatcher of the present invention.
Figure 3:
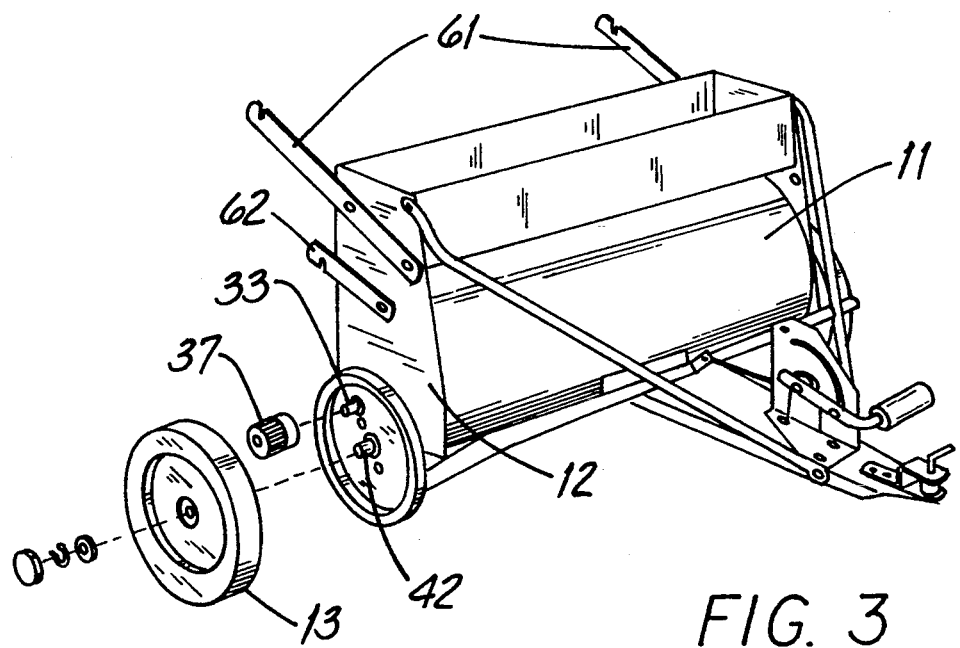
FIG. 3 is an exploded view of certain drive linkage components for independent rotation of the two tine sets.

Referring first to FIG. 1, there is generally shown a dethatching apparatus 10 embodying the present invention. Dethatcher 10 includes housing 11, at least two ground-engaging wheels 13, draw bar 15, lift bracket 47, lift bar 45, lift lever 49 and catcher bag 21.

Figure 2:
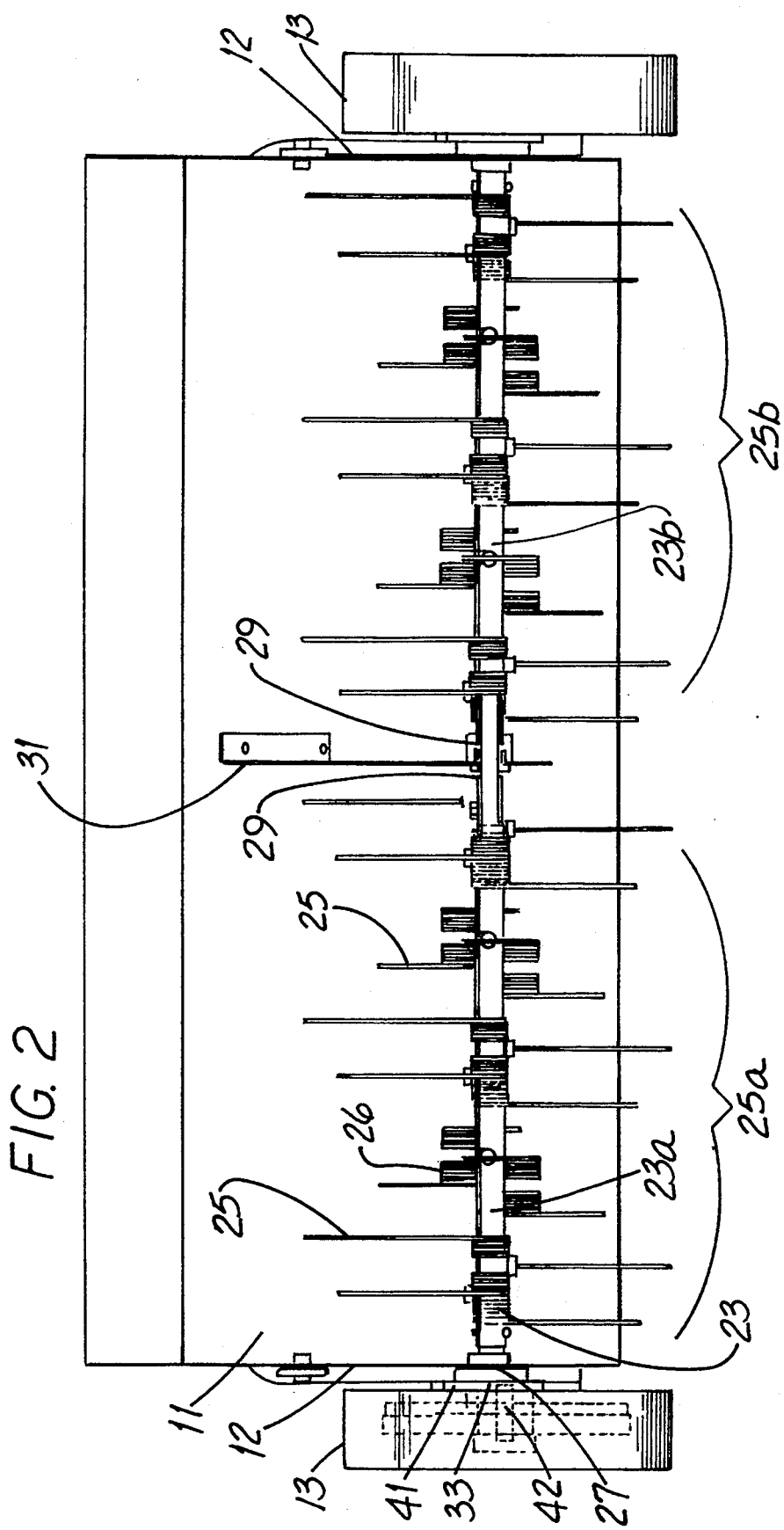
FIG. 2 shows the housing interior including two independent tine shafts and tine sets.
Figure 4:
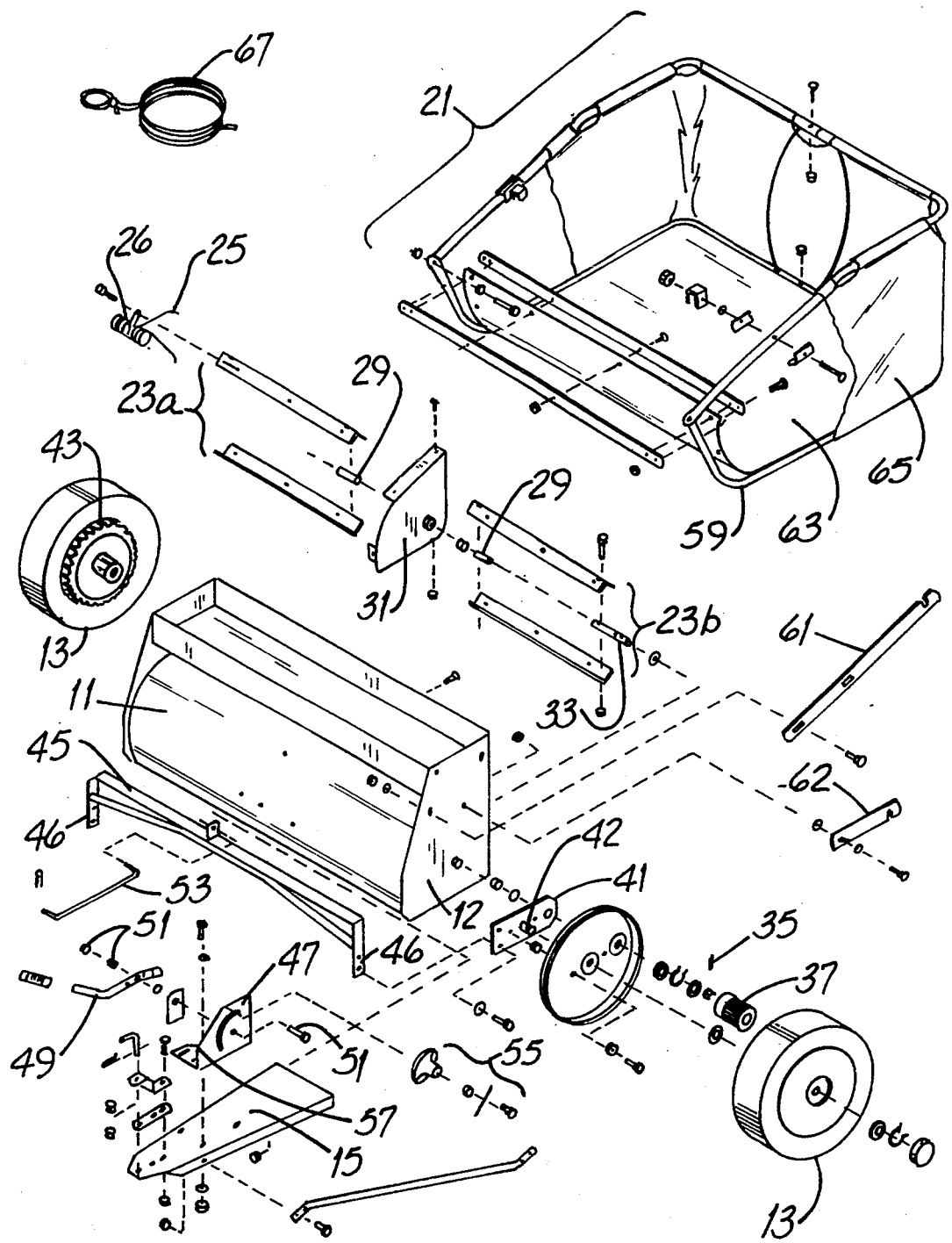
FIG. 4 is an exploded view of the invention.

FIGS. 2 and 4 show the independent sets of dethatching tines and the drive linkages which rotate such tine sets. Horizontal shaft 23 is positioned within housing 11. Shaft 23 consists of two independently rotating tine shafts 23(a) and 23(b) to which a plurality of tines 25 are attached. Preferably, tine shafts 23(a) and 23(b) are coaxial and are substantially the same length.

Figure 5:
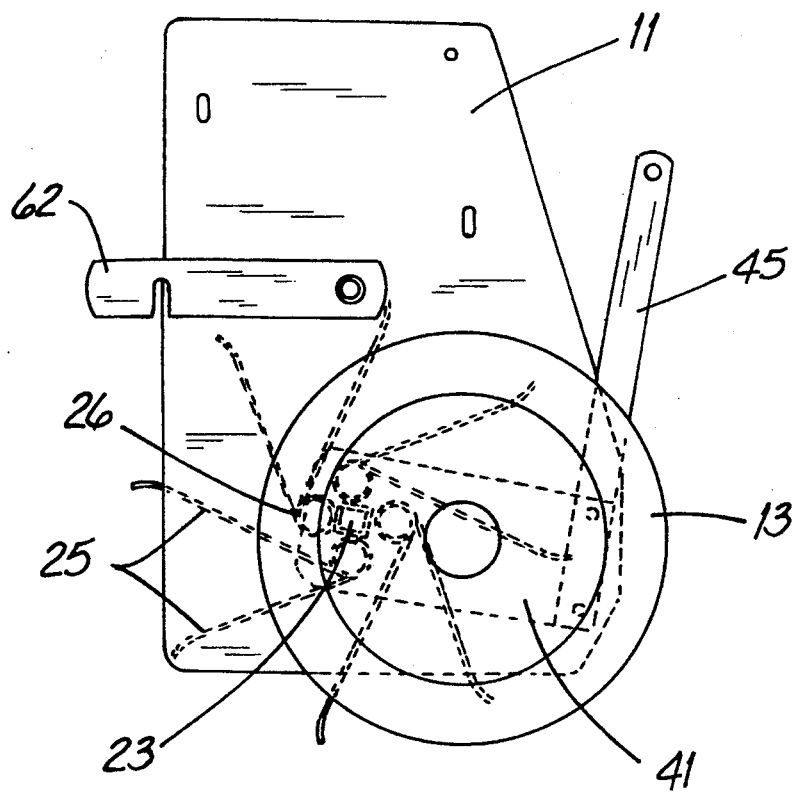
FIG. 5 is a side view of the invention including orientation of the tines.

Tines 25 project radially from shafts 23(a) and 23(b) and are organized into a first set 25(a) attached to tine shaft 23(a) and a second set 25(b) attached to tine shaft 23(b). As shown in FIG. 5, tines 25 are preferably swept back at an angle from tine shaft 23 to provide a raking action to the ground surface as they rotate. The tines 25 may be swept back at an angle of approximately 70°–115° from vertical. Preferably, angling is performed so as to uniformly distribute tines 25 about each tine shaft 23(a) or 23(b). Tines 25 are preferably made of steel wire and are biased in a direction opposite to their direction of rotation by at least one integral spring 26.

Each tine shaft 23(a) and 23(b) has one end 27 journaled in sidewall 12 of housing 11 and another end 29 preferably journaled in housing center assembly 31. End 27 projects outside the sidewall to form distal end 33. Each tine shaft 23(a) and 23(b) is independently rotatable.

Wheel mounting member 41 is positioned outside each sidewall 12. Each wheel mounting member 41 has an axle 42 which supports a ground-engaging wheel 13 along a wheel axis. Preferably, wheels 13 are coaxial. It is also preferred that coaxial wheels 13 are along an axis offset from the tine shaft 23 axis.

Tine shaft distal end 33 extends rotatably through member 41 on an axis offset from the wheel axis. Each tine shaft 23 supports its respective member 41.

Pinion gear 37 is coupled to tine shaft distal end 33. Rotation of pinion gear 37 causes rotation of its respective tine shaft. Member 41 is confined between sidewall 12 and pinion gear 37 which prevent lateral movement of member 41.

Ring gear 43 is on each wheel 13. Ring gear 43 is positioned to engage one pinion gear 37.

Forward movement of dethatcher 10 causes each drive linkage to independently rotate its tine set. For purpose of illustration, only one drive linkage is discussed. It is understood that the action of other drive linkages would be identical. Forward movement of dethatcher 10 causes wheel 13 to rotate. In response, ring gear 43 rotates pinion gear 37, tine shaft 23(a) and its tine set 25(a). Each drive linkage is preferably configured to rotate its tine set in a direction opposite to the direction of wheel rotation during forward movement of dethatcher 10.

Tine shafts 23(a) and 23(b), and their respective tine sets 25(a) and 25(b), rotate independently and in direct relationship to the wheel 13 to which each is coupled. Thus, if one wheel 13 rotates faster than the other wheel 13 (e.g. when turning a corner), the tine set coupled to that wheel 13 will rotate faster than the tine set coupled to the slower rotating wheel 13. This feature provides uniform dethatching as the apparatus changes direction.

A further significant advantage of having two coaxial tine shafts each driven by a separate drive linkage is that the torque supplied by each ground-engaging drive wheel is sufficient to rotate its shaft under most conditions. This improvement overcomes problems with the prior art in which a single drive wheel often supplied inadequate torque to rotate a longer, single, tine shaft. The drive linkage mechanism also provides high tine tip speed ensuring thorough dethatching.

FIGS. 1 and 4 show an embodiment of the invention which includes a pivot apparatus for automatically raising the tine sets upon substantial resistance to tine rotation. Resistance to rotation may increase when, for example, the tines strike a hard object such as a rock. When an obstruction is encountered by tines 25(a) or 25(b), resistance against such tines increases slowing or stopping rotation of tine shafts 23(a) and 23(b) as well as pinion gear 37 attached to each tine shaft distal end 33. In response to continued forward movement of dethatcher 10, the wheel-mounting members 41 pivot upwardly about the wheel axis to raise tine shafts 23(a) and 23(b) permitting dethatcher 10 to go over the obstruction.

Referring further to FIGS. 1 and 4 there is shown an apparatus for limiting the pivoting movement of wheel-mounting members 41 consequently limiting tine 25 height. In this embodiment, lift bar 45 has each opposite end 46 secured to one of the wheel-mounting members 41. Lift bar ends 46 are secured at a position radially offset from the wheel axis such that lift bar 45 moves in response to pivoting movement of wheel mounting members 41. A stop-member, such as draw bar 15, is secured with respect to the housing in a position to limit lift bar 45 movement, and thereby, wheel mounting member 41 movement limiting the extent to which tine sets 23(a) and 23(b) are raised automatically upon substantial resistance to tine rotation.

FIGS. 1 and 4 also show an apparatus for variably resisting the pivoting movement of each wheel-mounting member 41 consequently variably resisting changes in tine 25 height. Lift bracket 47 is secured with respect to housing 11, and is preferably secured to draw bar 15. Lift lever 49 is pivotably attached to lift bracket 47 by a variable resistance fastener 51 capable of changing the resistance to pivoting. Fastener 51 preferably includes a bolt, nut and spring sleeved over the bolt biasing the nut. Lift bar 45 is connected to lift lever 49 preferably by rod 53. In operation, resistance to movement of lift lever 49 is communicated to lift bar 45 and wheel mounting members 41 to oppose the pivoting motion of wheel mounting members 41 upon substantial resistance to tine 25 rotation.

Referring further to FIGS. 1 and 4, there is shown an apparatus for adjusting tines 25 to a predetermined height relative to the ground. In this embodiment, tine 25 height is adjusted by pivotal movement of lift lever 49 mounted on lift bracket 47. Movement of lift lever 49 is communicated to lift bar 45 by rod 53 which, in turn, pivots wheel mounting members 41 raising or lowering tine shafts 23(a) and 23(b). Moveable fastener 55 is secured along lift bracket 47 to prevent rearward movement of lift lever 49 beyond a preselected position preventing further lowering of tines 25. Friction surface 57 is formed in lift bracket 47 such that lift lever 49 is secured against friction surface 57 thereby securing tine 25 height in a preselected position.

FIGS. 1 and 4 show one embodiment of a catcher bag 21 positioned behind tines 25 for receiving thatch and plant matter. Catcher bag 21 includes frame 59 connected to housing 11 by a plurality of brackets 61 and 62. Catcher bag 21 preferably includes bottom 63 and side surfaces 65. Thatch and plant matter removed from a surface by tines 25 is deposited in catcher bag 21 for convenient disposal. In one embodiment, catcher bag 21 pivots about brackets 61 after first disengaging brackets 62 and pulling rope 67 for easy emptying of the thatch and plant matter.

While the principles of this invention have been described in connection with specific embodiments, it should be understood clearly that these descriptions are made only by way of example and are not intended to limit the scope of the invention.

What is claimed:

1. In a ground-driven dethatching apparatus having a horizontal shaft, a plurality of shaft-mounted tines, and a pair of ground-engaging wheels, the improvement wherein:

the tines are arranged in at least two sets;
a first drive linkage rotates one set of tines in response to rotation of one wheel; and a second drive linkage rotates the other set of tines independently in response to rotation of the other wheel.

2. The invention of claim 1 wherein each of the drive linkages rotates its tine set in a direction opposite to the direction of wheel rotation during forward movement of the dethatcher.

3. The invention of claim 1 wherein the wheels are coaxial.

4. The invention of claim 1 comprising two independently rotatable tine shafts each having its own set of tines secured thereto.

5. The invention of claim 4 wherein the tine shafts are coaxial with each other.

6. The invention of claim 5 wherein the wheels are coaxial with each other along an axis offset from the tine shaft axis.

7. The invention of claim 5 wherein the tine shafts are substantially the same length.

8. The invention of claim 4 further comprising pivot apparatus for automatically raising the tine sets upon substantial resistance to tine rotation.

9. The invention of claim 8 further comprising:
a housing having a pair of sidewalls, each of the tine shafts being journaled in one of the sidewalls and having a distal end outside such sidewall;
a pinion gear coupled to each tine shaft distal end;
a wheel-mounting member outside each of the sidewalls and supporting one of the wheels along a wheel axis, one of the tine shafts extending rotatably therethrough radially offset from the wheel axis;
a ring gear on each wheel positioned to engage one of the pinion gears;
whereby resistance-slowed rotation of a tine shaft and its respective drive linkage together with forward movement of the dethatcher causes the wheel-mounting members to pivot about the wheel axis to raise the tine shafts.

10. The invention of claim 9 further comprising apparatus for limiting the pivoting movement of the wheel-mounting members.

11. The invention of claim 10 wherein the pivot-limiting apparatus comprises:
a lift bar having each of its opposite ends secured to one of the wheel-mounting members at a position radially offset from the wheel axis such that the lift bar moves in response to pivoting movement of the wheel mounting members; and
a stop-member secured with respect to the housing in position to limit lift bar movement, and thereby, wheel mounting member movement;
thereby to limit the extent to which the tine sets are raised automatically upon substantial resistance to tine rotation.

12. The invention of claim 9 further comprising apparatus for variably resisting the pivoting movement of each wheel-mounting member.

13. The invention of claim 12 comprising:
a lift bracket secured with respect to the housing;
a lift lever pivotably attached to the lift bracket by a variable resistance fastener capable of changing the resistance to pivoting;
a lift bar having each of its opposite ends secured to one of the wheel-mounting members at a position radially offset from the wheel axis such that the lift bar moves in response to pivoting movement of the wheel mounting members; and
means connecting the lift lever and lift bar;
whereby resistance to movement of the lift lever is communicated to the lift bar and wheel mounting members to oppose the pivoting motion of the wheel mounting members upon substantial resistance to tine rotation.

14. The invention of claim 4 further comprising apparatus for adjusting the tines to a predetermined height relative to the ground.

15. The invention of claim 14 comprising:
a housing having a pair of sidewalls, each of the tine shafts being journaled in one of the sidewalls and having a distal end outside such sidewall;
a wheel-mounting member outside each of the sidewalls and supporting one of the wheels along a wheel axis, one of the tine shafts extending rotatably therethrough radially offset from the wheel axis;
a lift bar having each of its opposite ends secured to one of the wheel-mounting members at a position radially offset from the wheel axis such that the lift bar moves in response to pivoting movement of the wheel mounting members;
a lift bracket secured with respect to the housing for receiving a lift lever;
a lift lever pivotably attached to the lift bracket;
a movable fastener positioned along the lift bracket to prevent rearward movement of the lift lever beyond a preselected position;
means connecting the lift lever and lift bar;
whereby movement of the lift lever pivots the wheel mounting members to change the tine height and the fastener prevents further lowering of the tines.

16. The invention of claim 1 wherein the tines are swept back at an angle opposite to their direction of rotation.

17. The invention of claim 1 further comprising a catcher bag positioned behind the tines for receiving thatch and plant matter.

* * * * *